United States Patent
Kataoka et al.

(10) Patent No.: US 10,942,934 B2
(45) Date of Patent: Mar. 9, 2021

(54) NON-TRANSITORY COMPUTER-READABLE RECORDING MEDIUM, ENCODED DATA SEARCHING METHOD, AND ENCODED DATA SEARCHING APPARATUS

(71) Applicant: FUJITSU LIMITED, Kawasaki (JP)

(72) Inventors: Masahiro Kataoka, Kamakura (JP); Yoshikazu Kawakubo, Machida (JP); Shouji Iwamoto, Yamato (JP)

(73) Assignee: FUJITSU LIMITED, Kawasaki (JP)

(*) Notice: Subject to any disclaimer, the term of this patent is extended or adjusted under 35 U.S.C. 154(b) by 349 days.

(21) Appl. No.: 15/705,917

(22) Filed: Sep. 15, 2017

(65) Prior Publication Data

US 2018/0101580 A1 Apr. 12, 2018

(30) Foreign Application Priority Data

Oct. 7, 2016 (JP) .............................. JP2016-198914

(51) Int. Cl.
  *G06F 16/2458* (2019.01)
  *G06F 16/242* (2019.01)

(52) U.S. Cl.
  CPC ........ *G06F 16/2458* (2019.01); *G06F 16/242* (2019.01)

(58) Field of Classification Search
  CPC ............................ G06F 16/2458; G06F 16/242
  USPC .......................................................... 707/772
  See application file for complete search history.

(56) References Cited

U.S. PATENT DOCUMENTS

| | | | | |
|---|---|---|---|---|
| 5,140,644 A | * | 8/1992 | Kawaguchi | G06K 9/62 |
| | | | | 382/226 |
| 5,590,317 A | * | 12/1996 | Iguchi | G06F 16/93 |
| 5,606,690 A | * | 2/1997 | Hunter | G06F 40/268 |
| | | | | 715/255 |
| 5,704,060 A | * | 12/1997 | Del Monte | H03M 7/30 |
| 5,737,733 A | * | 4/1998 | Eller | H03M 7/30 |
| | | | | 707/708 |
| 5,963,942 A | * | 10/1999 | Igata | G06F 16/90344 |

(Continued)

FOREIGN PATENT DOCUMENTS

| | | |
|---|---|---|
| JP | 60-222960 | 11/1985 |
| JP | H05-028190 A | 2/1993 |

(Continued)

OTHER PUBLICATIONS

De Moura et al., "Fast and Flexible Word Searching on Compressed Text," ACM Transactions on Information Systems, vol. 18, No. 2, Apr. 2000, pp. 113-139. (Year: 2000).*

(Continued)

*Primary Examiner* — Phuong Thao Cao
(74) *Attorney, Agent, or Firm* — Xsensus LLP

(57) ABSTRACT

A data searching apparatus receives a searching character string with respect to an encoding document;
  referring to relevant information in which encoded data of a word according to an encoding rule of the encoding document is associated with a basic form of the word and a relevant word relevant to the basic form, with respect to a plurality of words, acquires a plurality of codes relevant to the basic form of the searching character string and a relevant word of the basic form and searches the encoding document by using an automaton in which the plurality of codes are set in a searching target.

12 Claims, 11 Drawing Sheets

(56) References Cited

U.S. PATENT DOCUMENTS

| | | | | |
|---|---|---|---|---|
| 5,991,713 A * | 11/1999 | Unger | G06F 40/221 | 704/9 |
| 6,269,189 B1 * | 7/2001 | Chanod | G06F 16/90344 | 382/229 |
| 6,502,064 B1 * | 12/2002 | Miyahira | G06F 17/2735 | 341/106 |
| 6,622,248 B1 * | 9/2003 | Hirai | G06F 16/316 | 713/193 |
| 6,775,663 B1 * | 8/2004 | Kim | G06F 16/3334 | |
| 7,818,813 B2 * | 10/2010 | Morisawa | G06F 16/313 | 726/27 |
| 8,037,035 B2 * | 10/2011 | Kataoka | G06F 16/172 | 707/693 |
| 8,332,209 B2 * | 12/2012 | Grinblat | H03M 7/3084 | 704/10 |
| 9,311,607 B2 * | 4/2016 | Shinzato | G06F 16/5866 | |
| 2002/0152219 A1 * | 10/2002 | Singh | H04L 69/04 | |
| 2002/0174119 A1 * | 11/2002 | Kummamuru | G06F 16/355 | |
| 2003/0195874 A1 * | 10/2003 | Akaboshi | G06F 16/90344 | |
| 2004/0034521 A1 * | 2/2004 | Kawakura | G06F 17/275 | 704/1 |
| 2004/0078190 A1 * | 4/2004 | Fass | G06F 17/241 | 704/7 |
| 2004/0187061 A1 * | 9/2004 | Matsuda | G06F 17/2217 | 714/746 |
| 2004/0225497 A1 * | 11/2004 | Callahan | H03M 7/3084 | 704/235 |
| 2005/0044070 A1 * | 2/2005 | Nagata | G06F 16/81 | |
| 2006/0265762 A1 * | 11/2006 | Morisawa | G06F 16/313 | 726/27 |
| 2008/0208566 A1 * | 8/2008 | Alonichau | G06F 17/2755 | 704/9 |
| 2009/0216911 A1 * | 8/2009 | Long | G06F 17/276 | 710/2 |
| 2009/0248652 A1 * | 10/2009 | Iwayama | G06F 16/3341 | |
| 2010/0005152 A1 * | 1/2010 | Ramamurthy | G06F 16/313 | 709/217 |
| 2010/0274786 A1 * | 10/2010 | Harris | H04L 29/12594 | 707/737 |
| 2010/0325157 A1 * | 12/2010 | Yamagaki | G06F 16/90344 | 707/780 |
| 2012/0011094 A1 * | 1/2012 | Yamagaki | G06F 7/02 | 706/45 |
| 2012/0197938 A1 * | 8/2012 | Yamada | G06F 16/2453 | 707/774 |
| 2013/0046995 A1 * | 2/2013 | Movshovitz | H04L 9/00 | 713/189 |
| 2013/0124492 A1 * | 5/2013 | Gao | G06F 17/273 | 707/706 |
| 2013/0226843 A1 * | 8/2013 | Syeda-Mahmood | G16H 50/70 | 706/12 |
| 2013/0287210 A1 * | 10/2013 | Matsuda | H04L 9/0894 | 380/44 |
| 2013/0318124 A1 * | 11/2013 | Ohta | G06F 16/3347 | 707/780 |
| 2015/0248432 A1 * | 9/2015 | Kataoka | H03M 7/3086 | 707/693 |
| 2016/0006456 A1 * | 1/2016 | Muramatsu | H03M 7/3084 | 707/693 |
| 2016/0042359 A1 * | 2/2016 | Singh | G06F 40/58 | 704/2 |
| 2016/0056839 A1 * | 2/2016 | Kataoka | H03M 7/30 | 341/87 |
| 2016/0171031 A1 * | 6/2016 | Kataoka | H03M 7/3088 | 707/741 |
| 2016/0197621 A1 * | 7/2016 | Hong | H03M 7/3088 | 715/236 |
| 2016/0210508 A1 * | 7/2016 | Ideuchi | G06F 40/12 | |
| 2016/0217111 A1 * | 7/2016 | Kataoka | G06F 40/157 | |
| 2016/0217207 A1 * | 7/2016 | Okura | G06F 16/3344 | |
| 2016/0226520 A1 * | 8/2016 | Kataoka | H03M 7/14 | |
| 2016/0232362 A1 * | 8/2016 | Conway | G06F 16/2458 | |
| 2016/0300020 A1 * | 10/2016 | Wetta | G06Q 50/24 | |
| 2017/0017707 A1 * | 1/2017 | Kataoka | G06F 16/31 | |
| 2017/0103085 A1 * | 4/2017 | Kataoka | G09C 1/00 | |
| 2017/0199849 A1 * | 7/2017 | Ideuchi | G06F 17/2217 | |
| 2017/0300542 A1 * | 10/2017 | Abe | G06F 16/254 | |
| 2018/0024990 A1 * | 1/2018 | Okura | G06F 16/93 | 704/9 |
| 2018/0026650 A1 * | 1/2018 | Ideuchi | G06F 40/126 | 341/50 |

FOREIGN PATENT DOCUMENTS

| | | |
|---|---|---|
| JP | 11-143893 | 5/1999 |
| WO | WO 2014/147672 A1 | 9/2014 |

OTHER PUBLICATIONS

Japanese Office Action dated Feb. 4, 2020 issued in corresponding Japanese Patent Application No. 2016-198914.

Takeda Yuki, "Pattern Matching over Compressed Texts: New Trend in Data Compression and Pattern Matching", Information Processing, Association Information Processing Society, Jul. 15, 2002, vol. 43, No. 7, pp. 763 to 769 with partial English Translation.

Fukushima, Toshikazu, "Basic technologies and trends of Web search engines: Part 1 Basic technologies", Basic Technology and the Latest Trend (Upper) Basic Technology, Information Management, Scientific Technology Promotion Corporation, Sep. 1, 2003, vol. 46, No. 6, pp. 363 to 372.

* cited by examiner

| STATIC CODE | BASIC FORM CODE | CHARACTER STRING | COLLATION FLAG |
|---|---|---|---|
| 20h | | SP (△) | |
| 21h | | BS (-△) | |
| ... | | ... | |
| 2Fh | | is | |
| 30h | | not | |
| ... | | ... | |

| STATIC CODE | BASIC FORM CODE | CHARACTER STRING | COLLATION FLAG |
|---|---|---|---|
| 6000h | | a | |
| 6001h | | abondon | |
| ... | | ... | |
| 6033h | A00068h | accessories | ON |
| 6034h | A00068h | accessory | ON |
| ... | | ... | |
| 6FFFh | | accessories | |
| 7000h | | accessory | |
| ... | | ... | |
| 7FFFh | | | |

NON-TRANSITORY COMPUTER-READABLE RECORDING MEDIUM, ENCODED DATA SEARCHING METHOD, AND ENCODED DATA SEARCHING APPARATUS

CROSS-REFERENCE TO RELATED APPLICATION(S)

This application is based upon and claims the benefit of priority of the prior Japanese Patent Application No. 2016-198914, filed on Oct. 7, 2016, the entire contents of which are incorporated herein by reference.

FIELD

The embodiment discussed herein is related to an encoded data searching program and the like.

BACKGROUND

In an encoding technology of the related art, there is an encoding technology in which a static dictionary and a dynamic dictionary are used in the case of coding a document. For example, the static dictionary is a dictionary in which a word is associated with a static code having a code length according to an appearance frequency of the word. The dynamic dictionary is a dictionary in which a character string appearing on the document a plurality of times is associated with a dynamic code. In the encoding technology of the related art, the word set in the static dictionary is not set in the static dictionary by being substituted with a static code of the static dictionary, and in the character string appearing a plurality of times, a character string according to the dynamic dictionary is registered, and a dynamic code is allocated to the character string.

Here, it is desirable that searching of whether or not a predetermined word is included in the document is performed from the document coded by the encoding technology without performing decoding, and thus, a searching efficiency is improved. In the technology of the related art, for example, in a case where a word of a searching target is searched from the coded document, the word of the searching target is compared to the static dictionary (or the dynamic dictionary), and thus, a code of the word of the searching target is specified. Then, in the technology of the related art, the specified code is compared to the coded document, and thus, the word of the searching target is searched.

Patent Literature 1: International Publication Pamphlet No. WO 2014/147672
Patent Literature 2: Japanese Laid-open Patent Publication No. 11-143893
Patent Literature 3: Japanese Laid-open Patent Publication No. 60-222960
Patent Literature 4: US Patent Application Publication No. 2016/0006456

SUMMARY

According to an aspect of an embodiment, a non-transitory computer-readable recording medium has stored therein a program that causes a computer to execute a process including: receiving a searching character string with respect to an encoding document; referring to relevant information in which encoded data of a word according to an encoding rule of the encoding document is associated with a basic form of the word and a relevant word relevant to the basic form, with respect to a plurality of words; acquiring a plurality of codes relevant to the basic form of the searching character string and a relevant word of the basic form; and searching the encoding document by using an automaton in which the plurality of codes are set in a searching target.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a data structure of a first automaton;

FIG. 10 is a diagram illustrating an example of a data structure of a second automaton;

DESCRIPTION OF EMBODIMENT(S)

However, in the technology of the related art described above, in the case of searching a synonym, there is a problem that it is not possible to perform the searching in one scanning, as with searching of a basic form.

For example, in the case of searching a word in the document, a case frequently occurs in which searching including a notation fluctuation is performed. Here, in the case of coding the document, the searching is easily performed insofar as the notation fluctuation of the word can be controlled, but it is difficult to completely control the notation fluctuation of the word, and thus, there is a case where the notation fluctuation retains in the coded document.

For this reason, in the case of searching the coded document in word unit, a plurality of codes corresponding to the notation fluctuation are searched. For example, in the case of searching a word of "direct deposit", "directly depositing", "direct depositing", "directly deposit", "directly deposited", and "directly deposits" are respectively searched in addition to "direct deposit", and thus, it is not possible to perform the searching in one scanning.

In addition, even in the case of searching a certain English word, there is a case where the searching is performed in consideration of not only the English word, which is a searching target, but also a word inflexion of the English word. For example, in the case of searching "goes", "went", "gone", and "going", which are word inflexions, are respectively searched in addition to "go", which is a basic form.

As described above, in the case of performing searching processing in consideration of the notation fluctuation or the word inflexion of the word, which is the searching target, it takes time to perform the searching according to the number of words relevant to each of the notation fluctuation and the word inflexion.

Preferred embodiments of the present invention will be explained with reference to accompanying drawings. Furthermore, the present invention is not limited by the examples.

Figure 1:
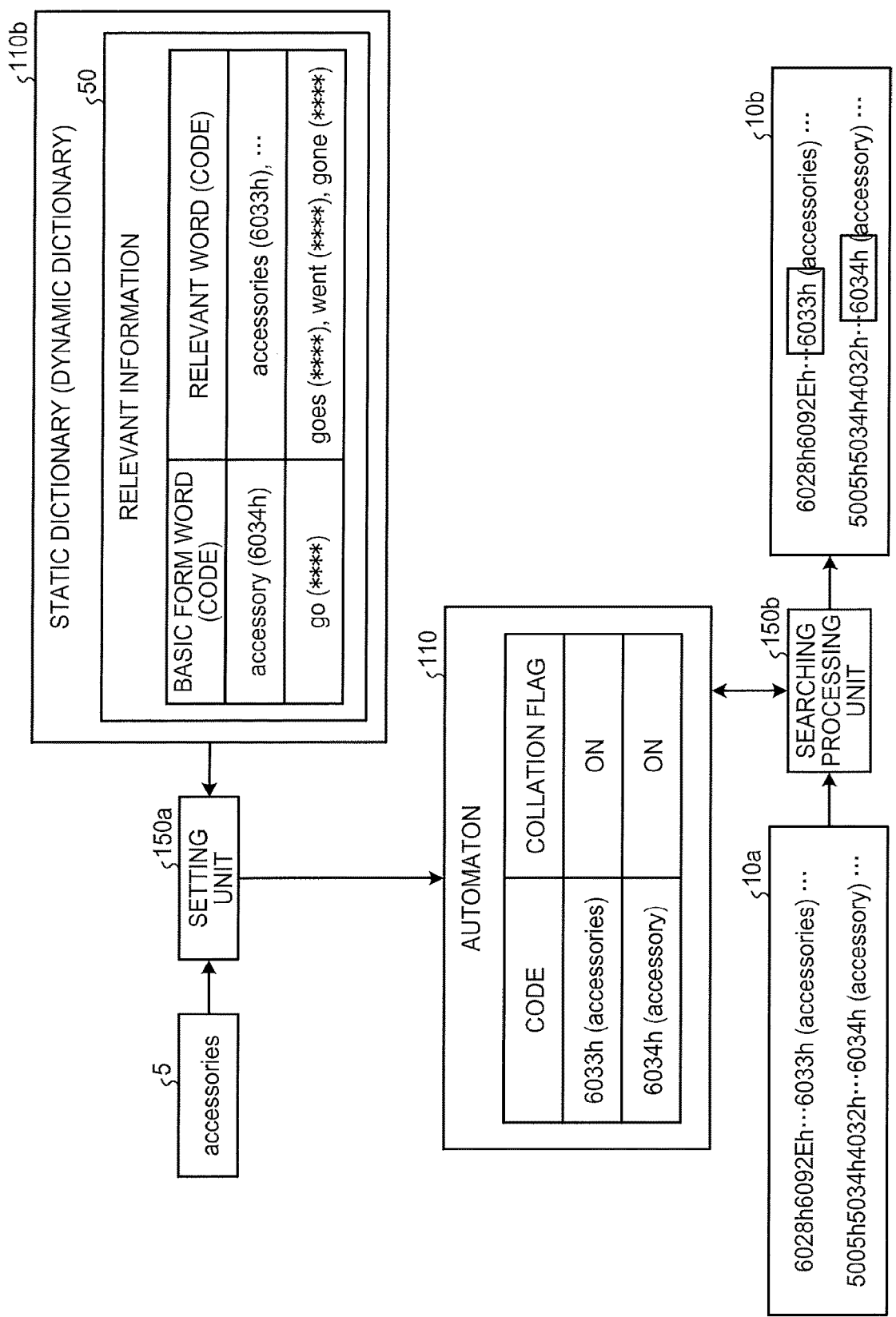
FIG. 1 is a diagram for describing processing of a data searching apparatus according to this example.

FIG. 1 is a diagram for illustrating processing of a data searching apparatus according to this example. The data searching apparatus is an example of an encoded data searching apparatus. As illustrated in FIG. 1, the data searching apparatus executes processing of receiving an input of a searching character string 5, which is a searching target, and of searching a word relevant to the searching character string 5 from a coded text file 10a, as described below.

A setting unit 150a of the data searching apparatus acquires a code of a basic form word and a code of a relevant word relevant to the basic form word of the searching character string 5, with reference to relevant information 50 included in a static dictionary (or a dynamic dictionary) 110b.

The relevant information 50 is information in which the basic form word is associated with the relevant word, and also retains information of the codes of the basic form word and the relevant word. Here, the basic form word is a word corresponding to a basic form of the word, and the relevant word is a word relevant to the basic word. For example, in a case where the basic form word is set to "go", and the relevant word is "goes, went, and gone". In addition, in a case where the basic word is set to "apple", the relevant word is "apples".

For example, in a case where "accessories" is received as the searching character string 5, the setting unit 150a compares "accessories" to the relevant information 50, and thus, acquires a code of "6034h" of a basic form word of "accessory" and a code of "6033h" of a relevant word of "accessories".

The setting unit 150a sets a plurality of acquired codes in an automaton 110 as the searching target. For example, in a case where the plurality of acquired codes are the code of "6034h" of the basic form word of "accessory" and the code of "6033h" of the relevant word of "accessories", collation flags corresponding to the code of "6034h" and the code of "6033h" are set to be "on".

In a case where the coded text file 10a is received, a searching processing unit 150b of the data searching apparatus compares the text file 10a to the automaton 110 in a state of being coded, and searches the word relevant to the searching character string 5. For example, the searching processing unit 150b inputs the code of the text file 10a into the automaton 110, and in a case where the input code is set to a code where the collation flag is turned on, the set code is determined as the word relevant to the searching character string 5. The word relevant to the searching character string 5 is a basic form word and a relevant word of the searching character string 5.

The searching processing unit 150b repeatedly executes the processing described above, and thus, specifies the codes of the basic form word and the relevant word of the searching character string 5 in the text file 10a, and outputs a searching result 10b in which the specified codes are highlighted.

As described above, the data searching apparatus according to this example specifies the codes of the basic form word and the relevant word of the searching character string 5, sets the collation flag of the automaton 110 such that each of the specified codes is the collation target, and uses the collation flag. For this reason, even in the case of searching a synonym, it is possible to perform the searching in one scanning, as with the searching of the basic form.

Subsequently, an encoding apparatus in which a text file is coded by using the static dictionary and the dynamic dictionary will be described before describing the configuration of the data searching apparatus according to this example.

Figure 2:
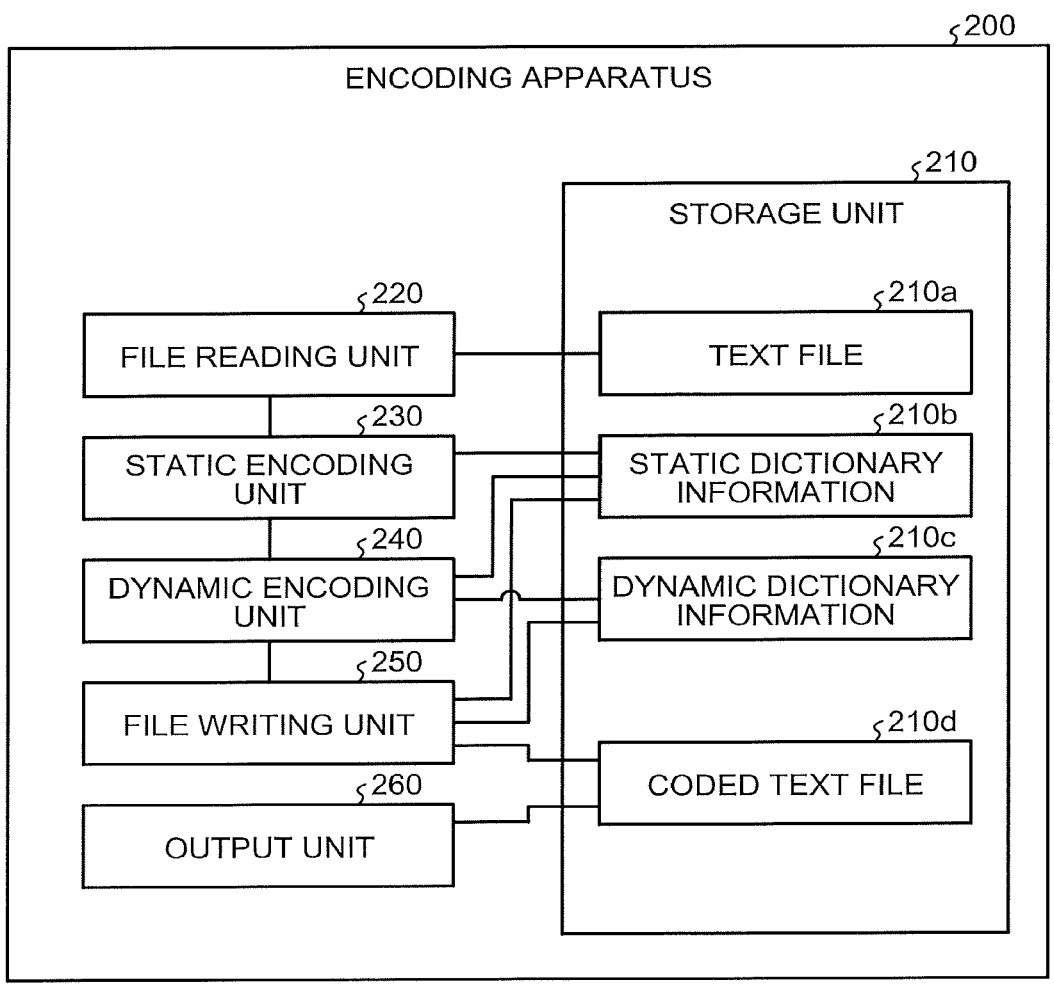
FIG. 2 is a functional block diagram illustrating a configuration of an encoding apparatus according to this example.

FIG. 2 is a functional block diagram illustrating the configuration of the encoding apparatus according to this example. As illustrated in FIG. 2, an encoding apparatus 200 includes a storage unit 210, a file reading unit 220, a static encoding unit 230, a dynamic encoding unit 240, a file writing unit 250, and an output unit 260.

The storage unit 210 includes a text file 210a, a static dictionary information 210b, a dynamic dictionary information 210c, and a coded text file 210d. For example, the storage unit 210 corresponds to a storage apparatus, for example, a semiconductor memory element such as a random access memory (RAM), a read only memory (ROM), and a flash memory, a hard disk drive (HDD), and the like.

Figure 3:
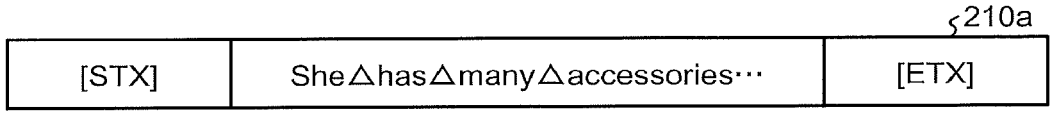
FIG. 3 is a diagram illustrating an example of a data structure of a text file.

The text file 210a is information of a document, which is a coding target. FIG. 3 is a diagram illustrating an example of a data structure of the text file. For example, as illustrated in FIG. 3, STX representing a start position of a text and ETX representing an end position of the text are included in the text file 210a. A document is stored in the text file 210a, subsequent to STX. In the example illustrated in FIG. 3, a document of "SheΔhasΔmanyΔaccessories . . . " is stored. "Δ" included in the document is a mark representing a space.

Figure 4:
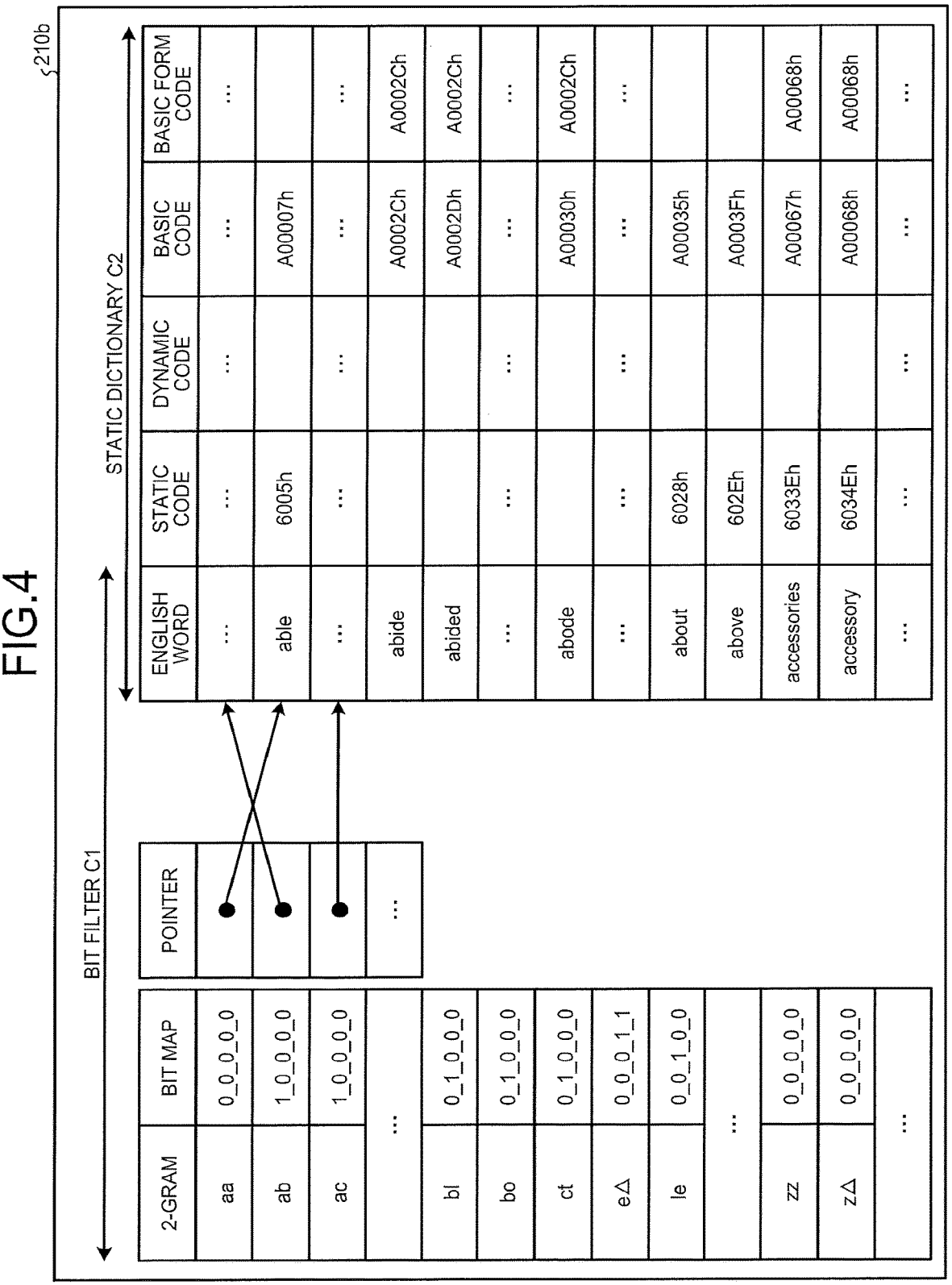
FIG. 4 is a diagram illustrating an example of a data structure of static dictionary information.

The static dictionary information 210b is information of a dictionary in which a word is associated with static code having a code length according to an appearance frequency of the word. FIG. 4 is a diagram illustrating an example of a data structure of the static dictionary information. As illustrated in FIG. 4, the static dictionary information 210b includes a bit filter C1 and a static dictionary C2.

The bit filter C1 includes a 2-gram, a bit map, a pointer, and an English word. The static dictionary C2 includes an English word, a static code, a dynamic code, a basic code, and a basic form code.

The 2-gram is information representing a character string (or a word) of two characters. The bit map represents a bit map corresponding to a character string of the 2-gram. For example, a bit map corresponding to "aa" is "0_0_0_0_0". The pointer is a pointer representing a position of an English word corresponding to the bit map.

The English word, for example, is a word having a high frequency, which is registered in the static dictionary C2. The static code is a code which is allocated to the English word. Static encoding using the static dictionary information 210b corresponds to processing of converting the English word into the static code. For example, the static code is allocated in advance to a word in which an appearance frequency is a high frequency. When dynamic encoding described below is performed, the dynamic code is allocated to a word in which an appearance frequency is a low frequency.

When the dynamic encoding using the dynamic dictionary information 210c, described below, is performed, the dynamic code is a code which is set at a timing when the dynamic code is allocated to a certain English word. The basic code is a code corresponding to each English word, and is used in the case of uniquely identifying the English words. In addition, the English word is stored in a buffer of the dynamic dictionary information 210c described below according to the basic code.

The basic form code is a code which is used in the case of identifying the basic form word and the relevant word. In a case where the corresponding English word is the basic form word, a basic code of the English word itself is set in the basic form code. In a case where the corresponding English word is a relevant word of a certain basic form word, a basic code of the certain basic form word is set in a basic form code of the relevant word.

For example, a basic form word is set to "accessory", and a relevant word of the basic form word of "accessory" is set to "accessories". In addition, a basic code of the basic form word of "accessory" is set to "A00068h". In this case, a basic form code which is stored in a record of the English word of "accessory" is "A00068h". A basic form code which is stored in a record of the English word of "accessories" is "A00068h".

For this reason, the basic code and the basic form code of each of the English words are compared to each other, and thus, it is possible to distinguish whether or not the English word is the basic form word. For example, in a case where the basic form code and the basic code of the English word are identical to each other, it is known that such an English word is the basic form word. In addition, in a case where the English word is not the basic form word, it is known that such an English word is a relevant word of the English word to which a basic code identical to the basic form code is allocated.

Figure 5:
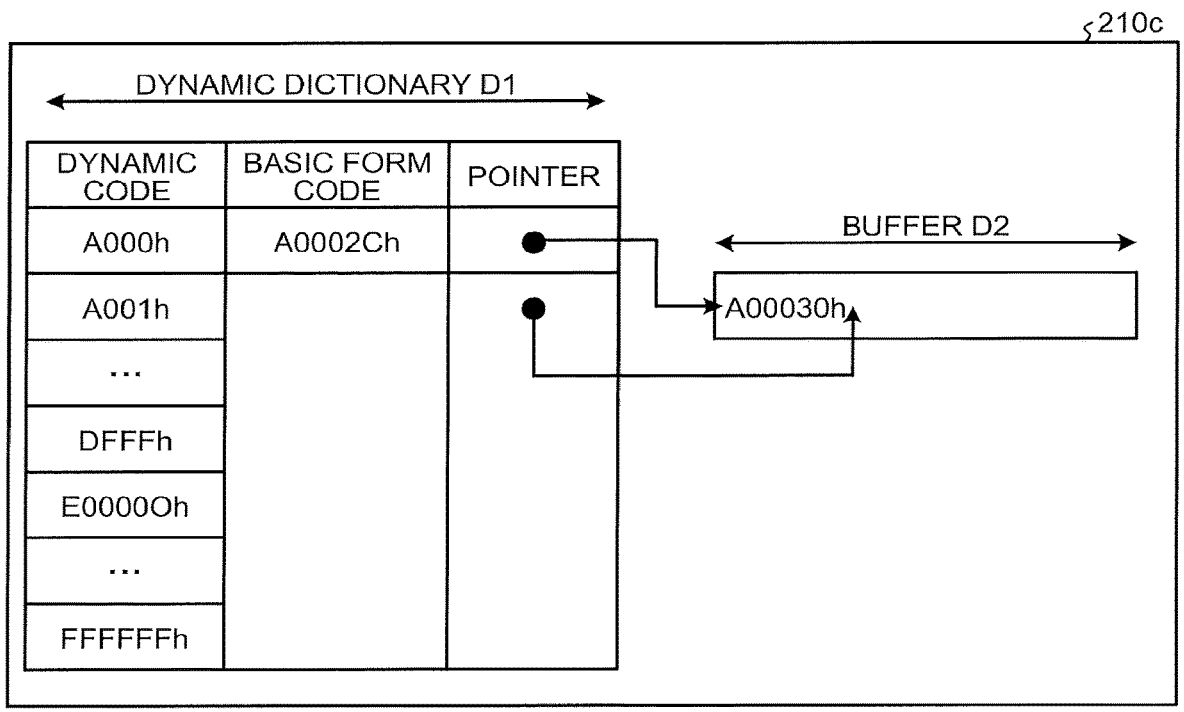
FIG. 5 is a diagram illustrating an example of a data structure of dynamic dictionary information.

The dynamic dictionary information 210c is information of a dictionary in which a character string appearing on the document a plurality of times is associated with the dynamic code. FIG. 5 is a diagram illustrating an example of a data structure of the dynamic dictionary information. As illustrated in FIG. 5, the dynamic dictionary information 210c includes a dynamic dictionary D1 and a buffer D2.

A dynamic code of the dynamic dictionary D1 is a code which is allocated to a basic code stored in the buffer D2. The basic form code is a basic form code corresponding to a word to which the dynamic code is allocated. The pointer is information representing the position of the buffer D2 storing a basic code of the word to which the dynamic code is allocated.

For example, when the dynamic encoding is performed, a dynamic code of "A000h" is allocated to an English word of "abode". A basic code of the English word of "abode" is set to "A00030h", and a basic form code is set to "A0002Ch". In this case, "A0002Ch" is set to the basic form code in association with the dynamic code of "A000h" of the dynamic dictionary D1. In addition, the basic code of "A00030h" is stored in the position of the buffer D2 represented by a pointer corresponding to the dynamic code of "A000h".

Figure 6:
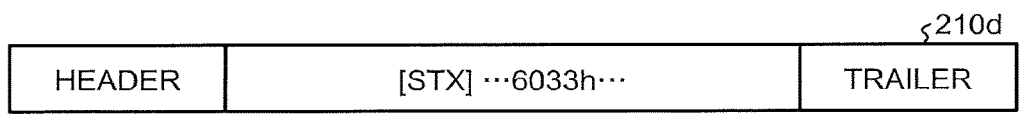
FIG. 6 is a diagram illustrating an example of a data structure of a coded text file.

The coded text file 210d is a file which is generated by coding the text file 210a. FIG. 6 is a diagram illustrating an example a data structure of the coded text file. As illustrated in FIG. 6, the coded text file 210d includes a header, a coded document, and a trailer.

For example, the header includes information relevant to an appearance frequency of a word and information identifying an algorithm which is used for performing coding. The trailer includes a static dictionary information 210b, the dynamic dictionary information 210c, and the like.

Return to the description of FIG. 2. The file reading unit 220 is a processing unit reading the text file 210a. The file reading unit 220 outputs the read text file 210a to the static encoding unit 230.

The static encoding unit 230 is a processing unit which repeatedly executes processing of comparing the word of the document included in the text file 210a to the bit filter C1 of the static dictionary information 210b, and of substituting the word set in the bit filter C1 with the static code. In the following description, the text file 210a which is converted into the static code by the static encoding unit 230 will be suitably referred to as static encoded data. For example, an English word to which the static code is allocated is converted into the static code, but an English word to which the static code is not allocated remains in the static encoded data as it is. The dynamic code is allocated to the English word to which the static code is not allocated, by the dynamic encoding described below, and thus, the English word is coded.

The dynamic encoding unit 240 is a processing unit which codes the word appearing a plurality of times with respect to the static encoded data, and thus, generates the coded document. The dynamic encoding unit 240 outputs the data of the coded document to the file writing unit 250.

Figure 7:
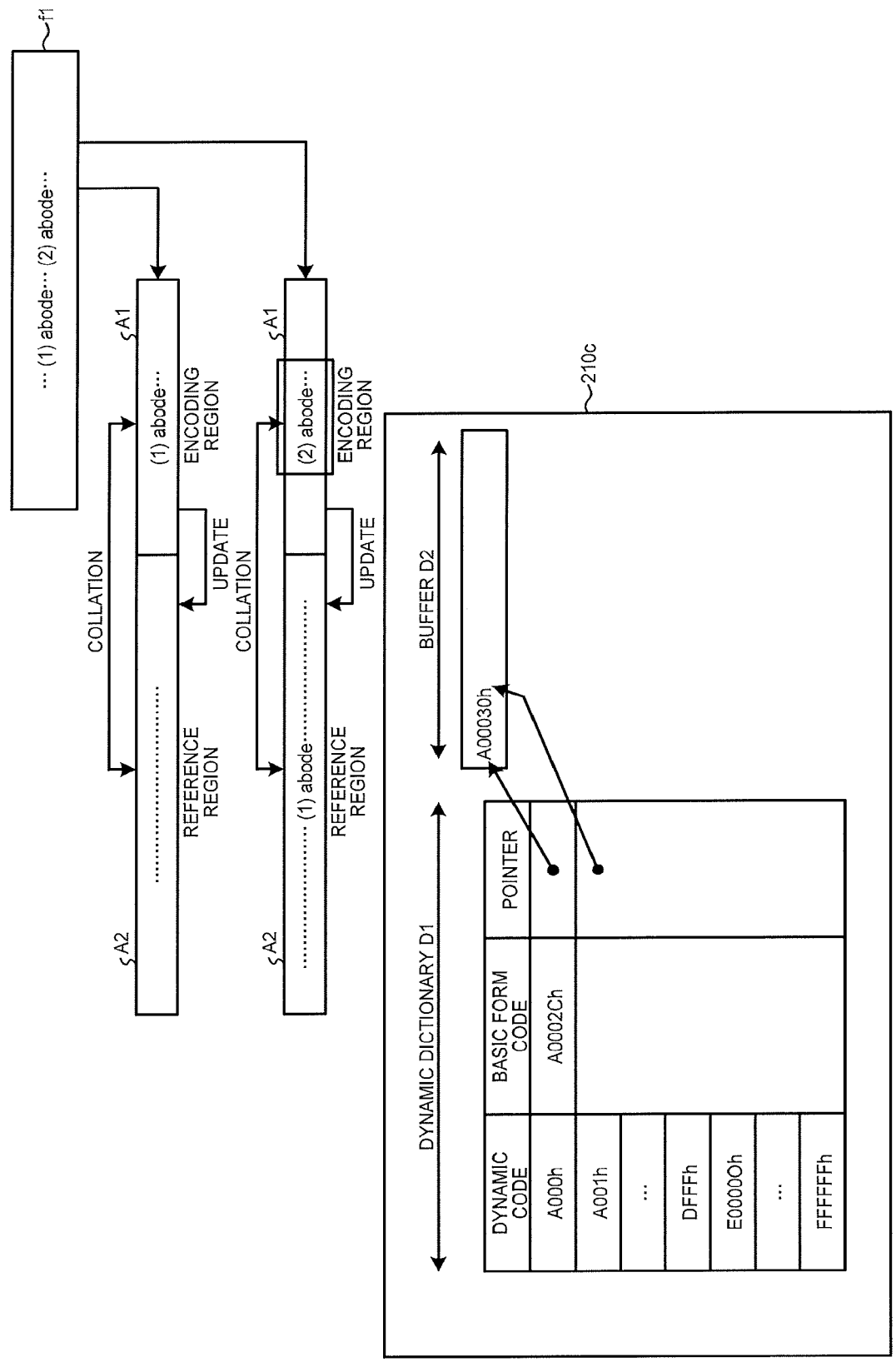
FIG. 7 is a diagram describing an example of processing of a dynamic encoding unit.

FIG. 7 is a diagram for illustrating an example of the processing of the dynamic encoding unit. The dynamic encoding unit 240 reads a character string from static encoded data f1, stores the read character string in an encoding region A1, and collates whether or not there is the same character string in the encoding region A1 and a reference region A2. In a case where there is the same character string as a result of the collation, the dynamic encoding unit 240 specifies such a character string as a character string appearing a plurality of times. The dynamic encoding unit 240 performs updating in which the character string stored in the encoding region A1 is added to the reference region A2 after the collation is ended, reads a character string having a predetermined length from the static encoded data f1, and stores the read character string in the encoding region A1.

FIG. 7 will be described. In the example illustrated in FIG. 7, the static encoded data f1 is set so "(1) abode . . . (2) abode . . . ". (1) and (2) of the static encoded data f1 are applied for convenience in order to distinguish each of the character strings of "abode", and are not actually included in the static encoded data f1. In addition, " . . . " of the static encoded data f1 corresponds to an unspecified character string and static code.

The dynamic encoding unit 240 reads a character string of "(1) abode . . . " having a predetermined length from the static encoded data f1, and stores the read character string in the encoding region A1. The dynamic encoding unit 240 compares the character string stored in the encoding region A1 to the character string stored in the reference region A2, and determines whether or not there is the same character string. In this case, there is no same character string, and thus, the dynamic encoding unit 240 stores "(1) abode . . . " stored in the encoding region A1, in the reference region A2, and thus, updates the reference region A2.

The dynamic encoding unit 240 reads a character string of "(2) abode . . . " having a predetermined length from the static encoded data f1, and stores the read character string in the encoding region A1. The dynamic encoding unit 240 compares the character string stored in the encoding region A1 to the character string stored in the reference region A2, and determines whether or not there is the same character string. In this case, there is the same character string of "abode", and thus, the dynamic encoding unit 240 specifies "abode" as the character string appearing a plurality of times. The dynamic encoding unit 240 stores "(2) abode . . . " stored in the encoding region A1, in the reference region A2, and thus, updates the reference region A2.

The dynamic encoding unit 240 specifies the basic code of "A00030h" corresponding to "abode" appearing a plurality of times on the basis of the static dictionary C2, and stores the specified basic code of "A00030h" in the buffer D2 of the dynamic dictionary information 210c. The dynamic encoding unit 240 allocates a head dynamic code of unallocated dynamic codes included in the dynamic dictionary D1 to the character string appearing a plurality of times. For example, the dynamic encoding unit 240 allocates the basic form code of "A0002Ch" corresponding to "abode" in association with the dynamic code of "A000h", and sets the position represented by the pointer in a head position of "A00030h" of the buffer D2. Accordingly, it is indicated that the dynamic code of "A000h" is allocated to the character string of "abode", and the dynamic encoding unit 240 converts "abode" of the static encoded data f1 to the dynamic code of "A000h", and thus, performs the dynamic encoding.

As described above, the dynamic encoding unit 240 encodes the character string appearing plurality of times to the dynamic code with respect to the static encoded data f1, and thus, generates the data of the coded document. The dynamic encoding unit 240 outputs the data of the coded document to the file writing unit 250.

In a case where the data of the coded document is acquired from the dynamic encoding unit 240, the file writing unit 250 is a processing unit which stores the acquired data of the coded document in the coded text file 210d. In addition, the file writing unit 250 stores information relevant to the appearance frequency of the word or information identifying the algorithm used for performing the coding, in the header of the coded text file 210d. The file writing unit 250 stores the static dictionary information 210b, the dynamic dictionary information 210c, and the like in the trailer of the coded text file 210d.

The output unit 260 is a processing unit which outputs the coded text file 210d stored in the storage unit 210 to the data searching apparatus described below.

Figure 8:
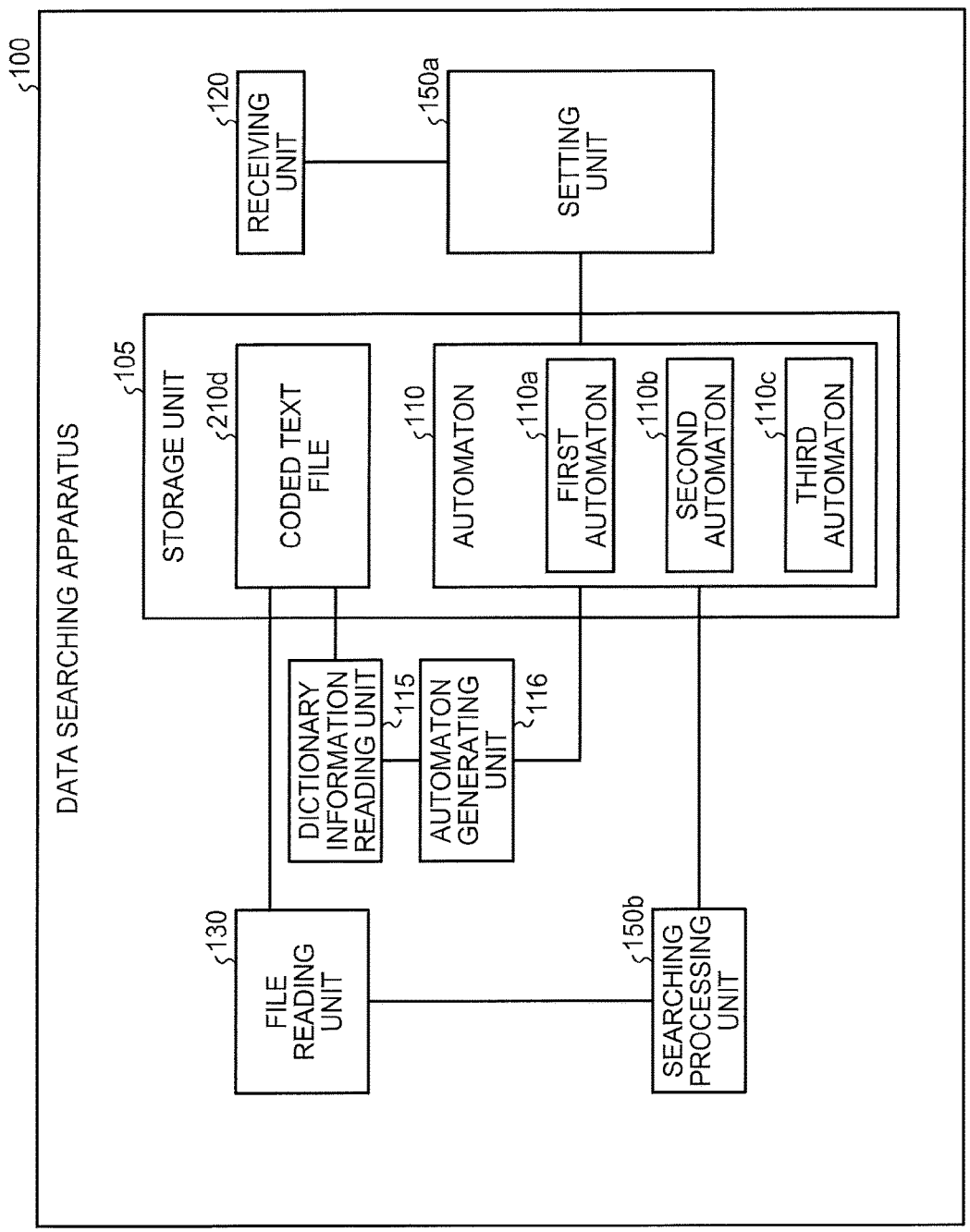
FIG. 8 is a functional block diagram illustrating a configuration of the data searching apparatus according to this example.

Subsequently, the configuration of the data searching apparatus executing the processing described in FIG. 1 will be described. FIG. 8 is a functional block diagram illustrating the configuration of the data searching apparatus according to this example. As illustrated in FIG. 8, a data searching apparatus 100 includes a storage unit 105, a dictionary information reading unit 115, an automaton generating unit 116, a receiving unit 120, a file reading unit 130, a setting unit 150a, and a searching processing unit 150b.

The storage unit 105 includes a coded text file 210d and an automaton 110. The storage unit 105 corresponds to a storage apparatus, for example, a semiconductor memory element such as a RAM, a ROM, and a flash memory, an HDD, and the like.

The coded text file 210d is a text file which is coded by the encoding apparatus 200 described above. A data structure of the coded text file 210d is identical to the data structure of the coded text file 210d described in FIG. 6.

The automaton 110 is an automaton which is used in the case of searching a code relevant to a searching character string described below. The code relevant to the searching character string is a code of a basic form word corresponding to the searching character string and a code of a relevant word relevant to the basic form word. For example, the automaton 110 includes a first automaton 110a, a second automaton 110b, and a third automaton 110c.

The first automaton 110a is an automaton which is used in the case of collating a character string or a word, coded to a code (a static code) of one byte.

FIG. 9 is a diagram illustrating an example of a data structure of the first automaton. As illustrated in FIG. 9, in the first automaton 110a, the static code of one byte, the basic form code, the character string or the word, and the collation flag are associated with each other.

The static code of the first automaton 110a is a code of one byte which is allocated to a word or a character string having a high frequency. The basic form code corresponds to the basic form code described in FIG. 4 or the like. The basic code of the basic form word is set in all basic form codes of static codes corresponding to a basic form word and a relevant word of a certain word. The character string is a character string or a word corresponding to the static code of one byte. The collation flag information for determining whether or not the corresponding static code is the collation target, and "on" is set in the collation flag in the static code of the collation target.

The second automaton 110b is an automaton which is used in the case of collating a character string or a word coded to a code (a static code) of two bytes.

FIG. 10 is a diagram illustrating an example of a data structure of the second automaton. As illustrated in FIG. 10, in the second automaton 110b, the static code of two bytes, the basic form code, the character string or the word, and the collation flag are associated with each other. The static code of the second automaton 110b is a code of two bytes which is allocated to a word or a character string having a high frequency. The character string is a character string or a word corresponding to the static code of two bytes. The description relevant to the basic form code and the collation flag is identical to the description relevant to the basic form code and the collation flag of the first automaton 110a.

The third automaton 110c is an automaton which is associated with the dynamic dictionary information 210c, and is used in the case of collating a character string or a word coded to a dynamic code.

Figure 11:
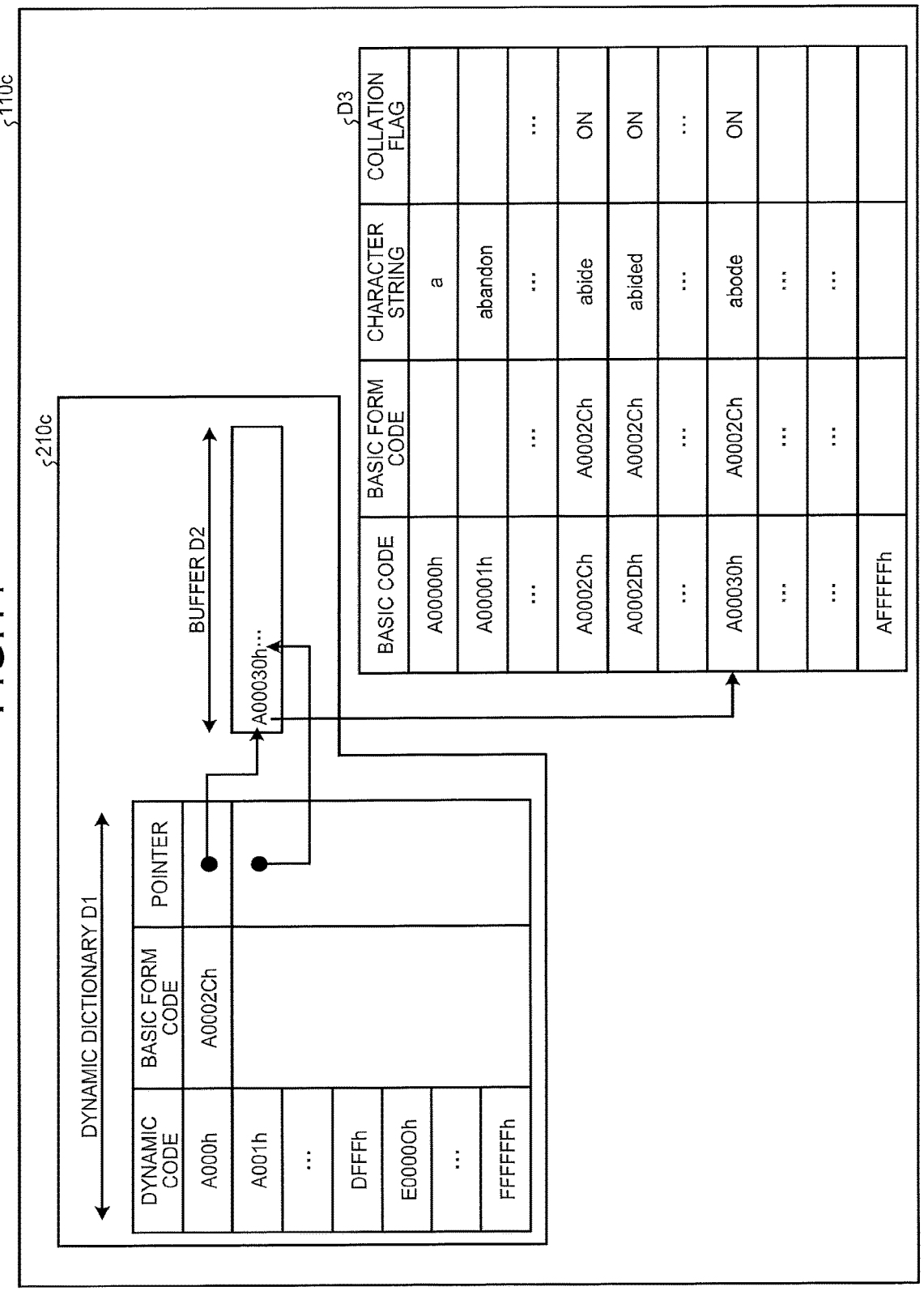
FIG. 11 is a diagram illustrating an example of a data structure of a third automaton.

FIG. 11 is a diagram illustrating an example of a data structure of the third automaton. As illustrated in FIG. 11, the third automaton 110c includes a dynamic dictionary information 210c and an automaton D3. The description relevant to the dynamic dictionary information 210c is identical to the description relevant to the dynamic dictionary information 210c described in FIG. 5.

The automaton D3 associates the basic code, the basic form code, the character string, and the collation flag with each other. The basic code is a static code of three bytes. The other description relevant to the basic code is identical to the description relevant to the basic code described in FIG. 4. The character string corresponds to the character string to which the dynamic code is allocated. The description of the basic form code and the collation flag is identical to the description relevant to the basic form code and the collation flag of the first automaton 110a.

For example, it is possible to specify the basic form word and the relevant word of the certain word according to the basic form codes of the static dictionary information 210b and the dynamic dictionary information 210c to be stored in the coded text file 210d or the basic form codes to be registered in the first automaton 110a, the second automaton 110b and the third automaton 110c. For this reason, the relevant information 50 described in FIG. 1 is included in the static dictionary information 210b and the dynamic dictionary information 210c to be stored in the coded text file 210d or the first automaton 110a, the second automaton 110b and the third automaton 110c.

Return to the description of FIG. 8. The dictionary information reading unit 115 is a processing unit which reads the static dictionary information 210b and the dynamic dictionary information 210c stored in the coded text file 210d. The dictionary information reading unit 115 outputs the static dictionary information 210b and the dynamic dictionary information 210c to the automaton generating unit 116.

The automaton generating unit 116 is a processing unit which generates the automaton 110 on the basis of the static dictionary information 210b and the dynamic dictionary information 210c.

An example of processing in which the automaton generating unit 116 generates the first automaton 110a will be described. The automaton generating unit 116 refers to the static dictionary C2 of the static dictionary information 210b, and specifies the static code of one byte, the character string or the word to which the static code of one byte is allocated, and the basic form code. The automaton generating unit 116 associates the specified static code of one byte, the specified basic form code, and the specified character string or word with each other, and sets the codes in the first automaton 110a. The automaton generating unit 116 repeatedly executes the processing described above, and thus, generates the first automaton 110a.

An example of processing in which the automaton generating unit 116 generates the second automaton 110b will be described. The automaton generating unit 116 refers to the static dictionary C2 of the static dictionary information 210b, and specifies the static code of two bytes, the character string or the word to which the static code of two bytes is allocated, and the basic form code. The automaton generating unit 116 associates the specified static code of two bytes, the specified basic form code, and the specified character string or word with each other, and sets the codes in the second automaton 110b. The automaton generating unit 116 repeatedly executes the processing described above, and thus, generates the second automaton 110b.

An example of processing in which the automaton generating unit 116 generates the third automaton 110c will be described. The automaton generating unit 116 sets the basic code of three bytes is set in the third automaton 110c. The automaton generating unit 116 refers to the buffer D2 of the dynamic dictionary information 210c, and determines whether or not a basic form code coincident with the basic form code of the automaton D3 is in the buffer D2.

In a case where the basic code identical to the basic code of the automaton D3 is in the buffer D2, the automaton generating unit 116 associates the basic code of the corresponding buffer D2 with the automaton D3. In addition, the automaton generating unit 116 specifies a basic form code corresponding to the basic code of the buffer D2, and sets the specified basic form code in the basic form code of the automaton D3, on the basis of the basic code of the buffer D2 represented by the pointer of the dynamic dictionary D1.

In addition, the same basic form code is set in a basic form code corresponding to the basic code of the relevant word.

For example, as illustrated in FIG. 11, the basic code of "A00030h" is registered in the buffer D2, and a basic form code corresponding to such a basic code is set to "A0002Ch". In this case, the automaton generating unit 116 sets "A0002Ch" in the basic form codes corresponding to the basic codes of "A0002Ch", "A0002Dh", and "A00030h". That is, it is known that the word of "abide" of the basic code of "A0002Ch" is a basic form word, and the word of "abided" of the basic code of "A0002Dh" and the word of "abode" of the basic code of "A00030h" are relevant words of the basic form word.

The receiving unit 120 is a processing unit receiving the input of the searching character string. The receiving unit 120 outputs the information of the received searching character string to the setting unit 150a.

The setting unit 150a compares the searching character string to the static dictionary information 210b and the dynamic dictionary information 210c which are stored in the coded text file 210d, and acquires searching character string the basic form word and the code of the basic form word, and the relevant word and the code of the relevant word by using the basic form code as a key.

The setting unit 150a compares the code of the basic form word and the code of the relevant word to each static code and each dynamic code of the automaton 110 such that the code of the basic form word and the code of the relevant word are the collation target. The setting unit 150a sets collation flags corresponding to each of the dynamic codes of each of the set static codes to be on.

The processing of the setting unit 150a will be described by using FIG. 10. For example, in a case where a word designated as the searching character string is set to "accessories", a basic form code corresponding to the word of "accessories" is "A00068h", a static code of the basic form word is "6034h", and a static code of the relevant word is "6033h". For this reason, the setting unit 150a sets collation flags corresponding to the static codes of "6033h" and "6034h" to be on, with respect to the second automaton 110b.

The processing of the setting unit 150a will be described by using FIG. 11. For example, in a case where a word designated as the searching character string is set to "abode", a dynamic code allocated to "abode" is set to "A000h". In addition, a basic code of the dynamic code of "A000h" is set to "A00030h". In this case, a basic form code is "A0002Ch", and a basic code corresponding to the basic form code is "A0002Ch", "A0002Dh", and "A00030h". For this reason, the setting unit 150a sets collation flags corresponding to the basic codes of "A0002Ch", "A0002Dh", and "A00030h" to be on, with respect to the third automaton 110c.

Furthermore, in a case where the basic form word and the relevant word of the searching character string are specified, the setting unit 150a may display candidate lists of the basic form word and the relevant word on a display apparatus (not illustrated), and may select the basic form word as the searching target and the relevant word. In this case, the setting unit 150a sets collation flags corresponding to codes of the selected basic form word and relevant word to be on.

The file reading unit 130 processing unit acquiring the data of the coded document which is stored in the coded text file 210d. The file reading unit 130 outputs the data of the coded document to the searching processing unit 150b.

The searching processing unit 150b is a processing unit which compares the automaton 110 to the coded document, and thus, searches the code of the basic form word corresponding to the searching character string and the code of the relevant word. The searching processing unit 150*b* displays a searching result on the display apparatus or the like.

For example, the searching processing unit 150*b* acquires a code from the coded document, and compares the acquired code to the static codes of the first and second automatons 110*a* and 110*b* and the dynamic code of the third automaton 110*c*. In a case where the acquired code is set to the static code or the dynamic code, and the corresponding collation flag is turned on, the searching processing unit 150*b* specifies the acquired code as the searching target. The searching processing unit 150*b* repeatedly executes the processing described above from the head code of the coded document to the final code. The searching processing unit 150*b* displays the searching result in which the code specified as the collation target is highlighted in the coded document, on the display apparatus or the like.

Figure 12:
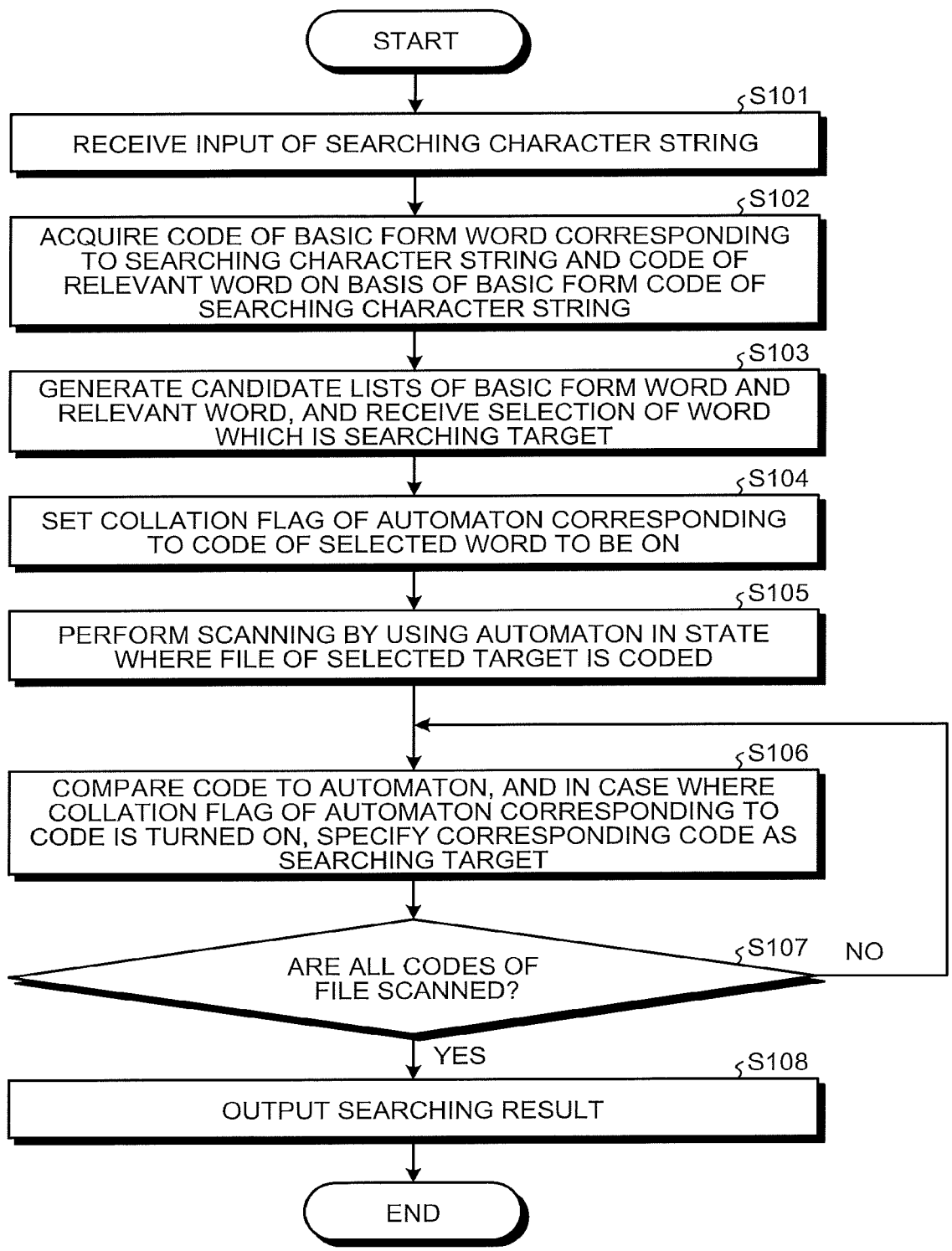
FIG. 12 is a flowchart illustrating a processing procedure of the data searching apparatus according to this example.

Next, a processing procedure of the data searching apparatus 100 according to this example will be described. FIG. 12 is a flowchart illustrating the processing procedure of the data searching apparatus according to this example. As illustrated in FIG. 12, the receiving unit 120 of the data searching apparatus 100 receives the input of the searching character string (Step S101). The setting unit 150*a* of the data searching apparatus acquires the code of the basic form word corresponding to the searching character string and the code of the relevant word on the basis of the basic form code of the searching character string (Step S102).

The setting unit 150*a* generates the candidate lists of the basic form word and the relevant word, and receives the selection of the word which is the searching target (Step S103). The setting unit 150*a* sets the collation flag of the automaton 110 corresponding to the code of the selected word to be on (Step S104).

The searching processing unit 150*b* performs scanning by using the automaton 110 in a state where the file of the selected target (the coded document) is coded (Step S105). The searching processing unit 150*b* compares the code to the automaton 110, and in a case where the collation flag of the automaton 110 corresponding to the code is turned on, specifies the corresponding code as the searching target (Step S106).

The searching processing unit 150*b* determines whether or not all codes of the file are scanned (Step S107). In a case where all of the codes of the file are not scanned (Step S107, No), the searching processing unit 150*b* allows the process to proceed to Step S106.

On the other hand, in a case where all of the codes of the file are scanned (Step S107, Yes), the searching processing unit 150*b* outputs the searching result (Step S108).

Next, the effect of the data searching apparatus 100 according to this example will be described. The data searching apparatus 100 specifies the codes of the basic form word and the relevant word of the searching character string, sets the collation flag of the automaton 110 such that each of the specified codes is the collation target, and uses the collation flag. For this reason, according to the data searching apparatus 100, even in the case of searching a synonym, it is possible to perform the searching in one scanning, as with the searching of the basic form.

However, in the example described above, a relationship focused on an inflection of a verb or a singular form and a plural form of a noun in an English word will be described as a relationship between the basic form word and the relevant word, but the relationship is not limited thereto.

For example, the relationship between the basic form word and the relevant word may be defined by being focused on the synonym, and the same basic form code may be allocated to the basic form word and the relevant word. In this case, any one word of a plurality of words which have the relationship of the synonym is set to the basic form word, and the remaining words are set to the relevant word. For example, in a case where the plurality of words which have the relationship of the synonym are set to "view, see, consider, regard", the basic form word is set to "view", and the remaining words of "see, consider, regard" are set to the relevant word.

In this case, in a case where any one of "view, see, consider, regard" is included in the searching character string, the setting unit 150*a* specifies the codes of "view, see, consider, regard", and sets the collation flag of the automaton 110 corresponding to the specified code to be on. The same applies to the other synonyms. By performing such processing, it is also possible to search the word which is the synonym of the searching character string in one scanning.

In addition, the relationship between the basic form word and the relevant word may be defined by being focused on a notation fluctuation, and the same basic code may be allocated to the basic form word and the relevant word. In this case, any one word of a plurality of words corresponding to the notation fluctuation is set to the basic form word, and the remaining words are set to the relevant word. For example, in a case where the plurality of words corresponding to the notation fluctuation is set to "direct deposit, directly depositing, direct depositing, directly deposits", the basic form word is set to "direct deposit", and the remaining words of "directly depositing, direct depositing, directly deposits" are set to the relevant words.

In this case, any one of "direct deposit, directly depositing, direct depositing, directly deposits" is included in the searching character string, the setting unit 150*a* specifies the codes of "direct deposit, directly depositing, direct depositing, directly deposits", and sets the collation flag of the automaton 110 corresponding to the specified code to be on. The same applies to the other notation fluctuations. By performing such processing, even in a case where the notation fluctuation is in the searching character string, it is also possible to search the word relevant to the searching character string in one scanning.

Further, the setting unit 150*a* further may receive instruction information of instructing whether the synonym is set to the searching target or the notation fluctuation word is set to the searching target, and may selectively acquire the codes of the basic form word and the relevant word on the basis of the received instruction information. In this case, first static dictionary information and first dynamic dictionary information, in which the relationship between the basic form word and the relevant word is defined by being focused on the synonym, and second static dictionary information and second dynamic dictionary information, in which the relationship between the basic form word and the relevant word is defined by being focused on the notation fluctuation, are selectively used. The first static dictionary information and the second static dictionary information, and the first dynamic dictionary information and the second dynamic dictionary information are stored in the storage unit 105.

For example, in the case of receiving the instruction information in which the synonym is set to the searching target, the setting unit 150*a* specifies the codes of the basic form word and the relevant word which have the relationship of the synonym with the searching character string, with reference to the first static dictionary information and the first dynamic dictionary information, and sets the collation flag of the automaton 110 corresponding to the specified code to be on.

In the case of receiving the instruction information in which the notation fluctuation word is set to the searching target, the setting unit 150a specifies the codes of the basic form word and the relevant word which have the relationship of the notation fluctuation with the searching character string, with reference to the second static dictionary information and the second dynamic dictionary information, and sets the collation flag of the automaton 110 corresponding to the specified code to be on.

In addition, the setting unit 150a may receive instruction information in which both of the synonym and the notation fluctuation word are set to the searching target. In this case, the setting unit 150a specifies the codes of the basic form word and the relevant word which have the relationship of the synonym with the searching character string, and the codes of the basic form word and the relevant word which have the relationship of the notation fluctuation with the searching character string, with reference to the first static dictionary information and the second static dictionary information, and first dynamic dictionary information and the second dynamic dictionary information. Then, the setting unit 150a sets the collation flag of the automaton 110 corresponding to the specified code to be on.

Thus, the setting unit 150a selectively acquires the codes of the basic form word and the relevant word corresponding to the synonym or the notation fluctuation word on the basis of the instruction information, and sets the collation flag of the automaton 110, and thus, it is possible to efficiently execute searching corresponding to the synonym or the notation fluctuation.

Figure 13:
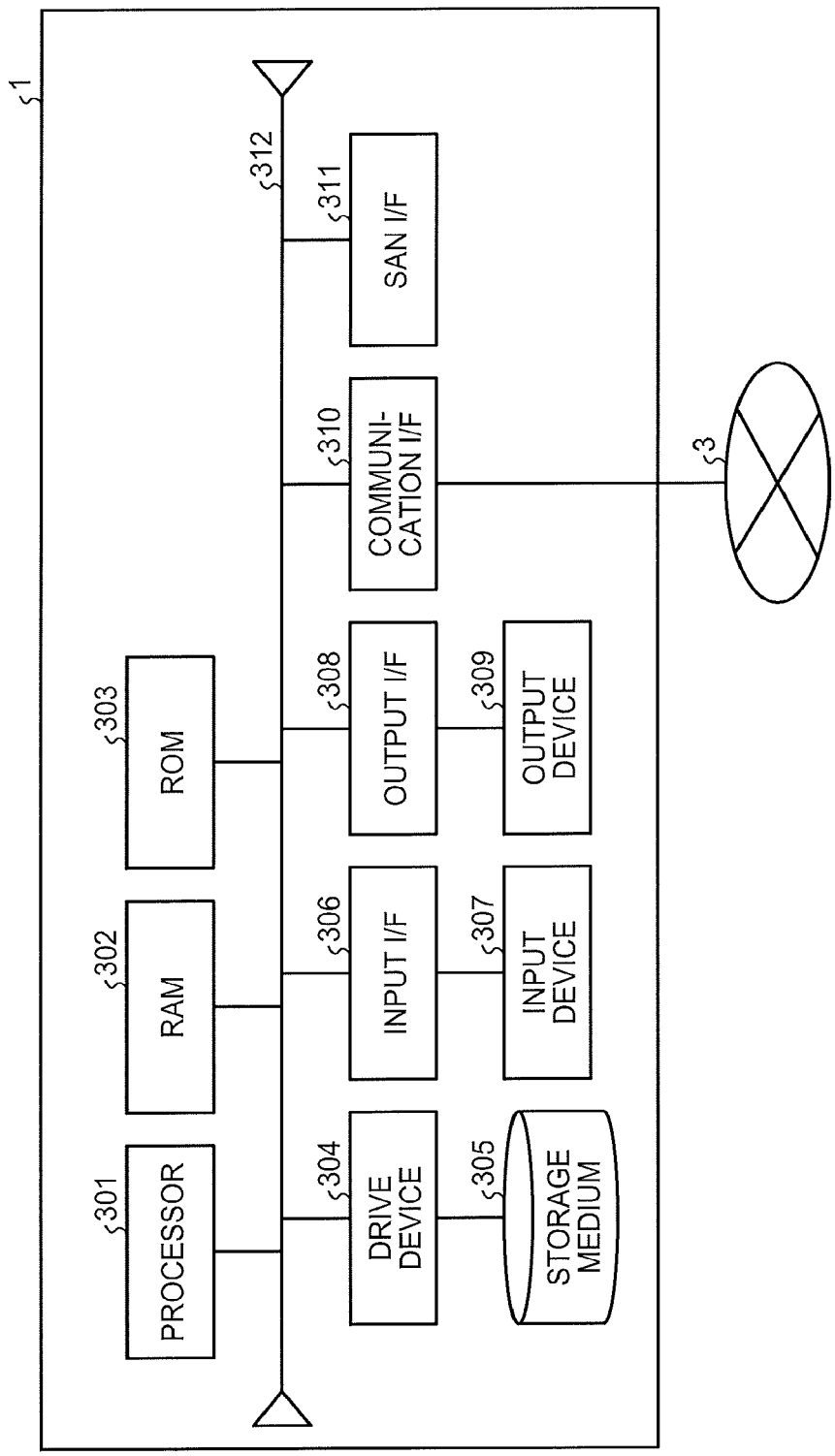
FIG. 13 is a diagram illustrating a hardware configuration example of a computer.

In the following description, hardware and software used in this embodiment will be described. FIG. 13 is a diagram illustrating a hardware configuration example of a computer. A computer 1, for example, includes a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, a bus 312, and the like. The respective hardwares are connected to each other through the bus 312.

The RAM 302 is a readable and writable memory device, and examples of the RAM 302 include a semiconductor memory such as a static RAM (SRAM) or a dynamic RAM (DRAM), a flash memory instead of the RAM, and the like. The ROM 303 includes a programmable ROM (PROM) and the like. The drive device 304 is an apparatus performing at least one of reading or writing with respect to information recorded in the storage medium 305. The storage medium 305 stores the information written by the drive device 304. The storage medium 305, for example, is a storage medium such as a hard disk, a flash memory such as a solid state drive (SSD), a compact disc (CD), a digital versatile disc (DVD), a Blu-ray disc. In addition, for example, in the computer 1, the drive device 304 and the storage medium 305 are provided with respect to each of a plurality of types of storage mediums.

The input interface 306 is a circuit which is connected to the input device 307, and transmits an input signal received from the input device 307 to the processor 301. The output interface 308 is a circuit which is connected to the output device 309, and allows the output device 309 to execute output according to an instruction of the processor 301. The communication interface 310 is a circuit which controls communication through a network 3. The communication interface 310, for example, is a network interface card (NIC) and the like. The SAN interface 311 is a circuit which controls communication with the storage apparatus connected to the computer 1 through the storage area network. The SAN interface 311, for example, is a host bus adapter (HBA) and the like.

The input device 307 is an apparatus which transmits an input signal according to a manipulation. The input signal, for example, is a pointing device such as a key apparatus such as keyboard or a button attached onto the main body of the computer 1, a mouse, or a touch panel. The output device 309 is an apparatus which outputs information according to the control of the computer 1. The output device 309, for example, is an image output apparatus (a display device) such as a display, a sound output apparatus such as a speaker, or the like. In addition, for example, an input and output apparatus such as a touch screen is used as the input device 307 and the output device 309. In addition, the input device 307 and the output device 309 may be integrated with the computer 1, or may be, for example, an apparatus which is connected to the computer 1 from the outside without being included in the computer 1.

For example, the processor 301 reads out a program stored in the ROM 303 or the storage medium 305 to the RAM 302, and performs the processing corresponding to the encoding apparatus 200 or the processing corresponding to the data searching apparatus 100 according to the procedure of the read program. At this time, the RAM 302 is used as a work area of the processor 301. The ROM 303 and the storage medium 305 store a program file (an application program 24, middleware 23, an OS 22, and the like, described below) or a data file (for example, the text file 210a, the coded text file 210d, and the like), and the RAM 302 is used as the work area of the processor 301, and thus, the functions of the storage units 105 and 210 are realized. The program read by the processor 301 will be described by using FIG. 14.

Figure 14:
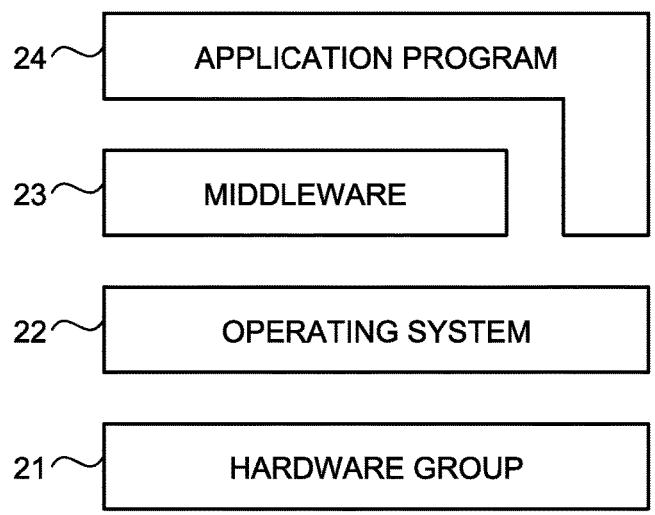
FIG. 14 is a diagram illustrating a configuration example of a program operated in the computer.

FIG. 14 is a diagram illustrating a configuration example of the program which is operated in the computer. An operating system (OS) 22 controlling a hardware group 21 (301 to 312) illustrated in FIG. 14 is operated in the computer 1. The processor 301 is operated in the procedure according to the OS 22, and the hardware group 21 is controlled and managed, and thus, the processing according to the application program 24 or the middleware 23 is executed by the hardware group 21. Further, in the computer 1, the middleware 23 or the application program 24 is read in the RAM 302, and is executed by the processor 301.

In a case where a coded function is called, the processor 301 performs the processing based on at least a part of the middleware 23 or the application program 24, (the hardware group 21 is controlled by the processing on the basis of the OS 22), and thus, the function of the encoding apparatus 200 is realized. In addition, in a case where a data searching function is called, the processor 301 performs the processing based on at least a part of the middleware 23 or the application program 24, (the hardware group 21 is controlled by the processing on the basis of the OS 22), and thus, the function of the data searching apparatus 100 is realized. Each of the coded function and the data searching function may be included in the application program 24 itself, or may be a part of the middleware 23 which is executed by being called according to the application program 24.

Figure 15:
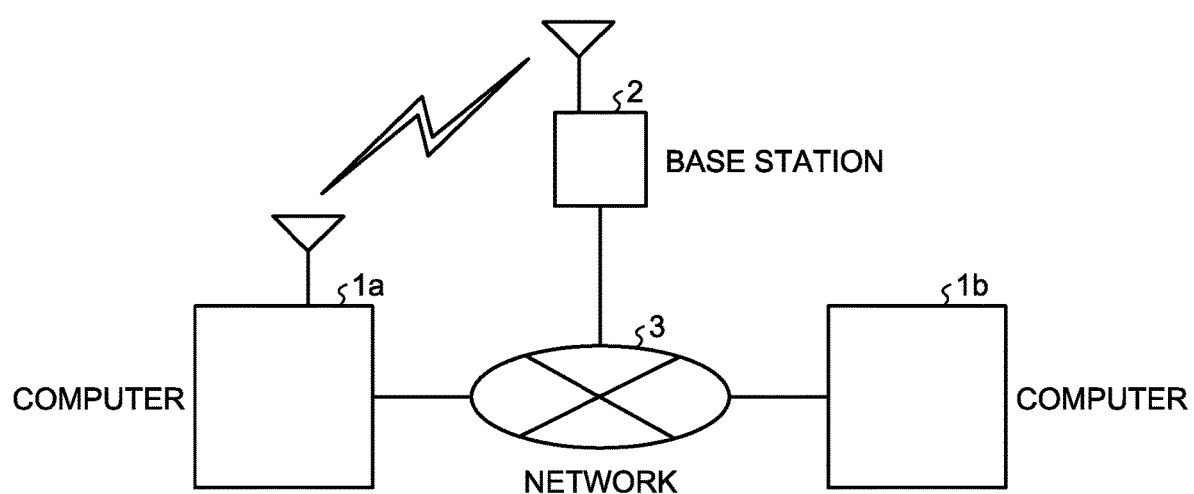
FIG. 15 is a diagram illustrating a configuration example of an apparatus in a system of an embodiment.

FIG. 15 is a diagram illustrating a configuration example of an apparatus of a system of the embodiment. The system of FIG. 15 includes a computer 1a, a computer 1b, a base station 2, and a network 3. The computer 1*a* is connected to the network 3 which is connected to the computer 1*b* at least in a wireless manner or a wired manner.

The encoding apparatus 200 illustrated in FIG. 2 and the data searching apparatus 100 illustrated in FIG. 8 may be included in any one of the computer 1*a* and the computer 1*b* illustrated in FIG. 15. The computer 1*b* may include the encoding apparatus 200, and the computer 1*a* may include the data searching apparatus 100, or the computer 1*b* may include the data searching apparatus 100, and the computer 1*a* may include the encoding apparatus 200. In addition, both of the computer 1*a* and the computer 1*b* may include the encoding apparatus 200 and the data searching apparatus 100.

Hereinafter, a part of a modification example of the embodiment described above will be described. Not only the modification example described below but also a design modification within the range not departing from the gist of the present invention are suitably performed. The target of the coding processing may be a monitoring message or the like output from the system in addition to the data in the file. For example, processing is performed in which a monitoring message sequentially stored in a buffer is coded by the coding processing described above, and is stored as a log file. In addition, for example, the monitoring message may be coded to the page unit in the database, or a plurality of pages may be coded in the collected unit.

By associating a synonym at a code level, in the case of searching a synonym, it is possible to perform searching in one scanning even, as with searching of a basic form.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording, medium having stored therein a program that causes a computer to execute a process comprising:
receiving, from a user, a searching character string with respect to an encoding document into which a document is encoded according to an encoding rule, wherein the encoding document includes dictionary information that includes a word included in the document and a code thereof, the dictionary information further including relevant information in which the word is associated with a basic form of the word and a relevant word relevant to the basic form, by using identification information of the basic form of the word, and a code of the relevant word being included in the dictionary information;
creating, based on the dictionary information, a first automaton, a second automaton, and a third automaton, each including a word, a code thereof, identification information of a basic form of the word, and a flag in association with each other, wherein the code included in the first automaton is of one-byte length, the code included in the second automaton is of two-byte length and the code included in the third automaton is of three-byte length;
presenting to the user a word included in the searching character string, a basic form of the word, and a relevant word relevant to the basic form, specified by referring to the relevant information, so that the user specifies the word, the basic form or the relevant word;
acquiring a code of the specified word, basic form, or relevant word by referring to the dictionary information; and
searching the encoding document by using the first automaton, the second automaton, or the third automaton, in which a flag of the acquired code is set indicating a searching target.

2. The non-transitory computer-readable recording medium according to claim 1,
wherein the relevant word is a synonym of the basic form or a notation fluctuation word which is a similar sounding and similar meaning word to the basic form and is a different form from the basic form.

3. The non-transitory computer-readable recording medium according to claim 2, the process further comprising:
receiving instruction information that specifies either the synonym or the notation fluctuation word as the searching target,
wherein the acquiring acquires a plurality of codes corresponding to the synonym of the basic form or the notation fluctuation word, on the basis of the instruction information.

4. The non-transitory computer-readable recording medium according to claim 1,
wherein the searching compares the code included in the encoding document with the first automaton, the second automaton, or the third automaton and specifies a code and a flag of which is set in the first automaton, the second automaton, or the third automaton, indicating the searching target.

5. An encoded data searching method comprising:
receiving, from a user, a searching character string with respect to an encoding document into which a document is encoded according to an encoding rule, wherein the encoding document includes dictionary information that includes a word included in the document and a code thereof, the dictionary information further including relevant information in which the word is associated with a basic form of the word and a relevant word relevant to the basic form, by using identification information of the basic form of the word, and a code of the relevant word being included in the dictionary information, using a processor;
creating, based on the dictionary information, a first automaton, a second automaton, and a third automaton, each including a word, a code thereof, identification information of a basic form of the word, and a flag in association with each other, wherein the code included in the first automaton is of one-byte length, the code included in the second automaton is of two-byte length and the code included in the third automaton is of three-byte length;
presenting to the user a word included in the searching character string, a basic form of the word, and a relevant word relevant to the basic form, specified by referring to the relevant information, so that the user specifies the word, the basic form or the relevant word;
acquiring a code of the specified word, basic form, or relevant word by referring to the dictionary information, using the processor; and searching the encoding document by using the first automaton, the second automaton, or the third automaton, in which a flag of the acquired code is set indicating a searching target, using the processor.

6. The encoded data searching method according to claim 5,
wherein the relevant word is a synonym of the basic form or a notation fluctuation word which is a similar sounding and similar meaning word to the basic form and is a different form from the basic form.

7. The encoded data searching method according to claim 6, further comprising:
receiving instruction information that specifies either the synonym or the notation fluctuation word as the searching target,
wherein the acquiring acquires a plurality of codes corresponding to the synonym of the basic form or the notation fluctuation word, on the basis of the instruction information.

8. The encoded data searching method according to claim 5,
wherein the searching compares the code included in the encoding document with the first automaton, the second automaton or the third automaton, and specifies a code and a flag of which is set in the first automaton, the second automaton or the third automaton, indicating the searching target.

9. An encoded data searching apparatus, comprising:
a processor that executes a process comprising:
receiving, from a user, a searching character string with respect to an encoding document into which a document is encoded according to an encoding rule, wherein the encoding document includes dictionary information that includes a word included in the document and a code thereof, the dictionary information further including relevant information in which the word is associated with a basic form of the word and a relevant word relevant to the basic form, by using identification information of the basic form of the word, and a code of the relevant word being included in the dictionary information;
creating, based on the dictionary information, a first automaton, a second automaton, and a third automaton, each including a word, a code thereof, identification information of a basic form of the word, and a flag in association with each other, wherein the code included in the first automaton is of one-byte length, the code included in the second automaton is of two-byte length and the code included in the third automaton is of three-byte length;
presenting to the user a word included in the searching character string, a basic form of the word, and a relevant word relevant to the basic form, specified by referring to the relevant information, so that the user specifies the word; the basic form or the relevant word;
acquiring a code of the specified word, basic form, or relevant word by referring to the dictionary information; and
searching the encoding document by using the first automaton, the second automaton, or the third automaton, in which a flag of the acquired code is set indicating a searching target.

10. The encoded data searching apparatus according to claim 9,
wherein the relevant word is a synonym of the basic form or a notation fluctuation word which is a similar sounding and similar meaning word to the basic form and is a different form from the basic form.

11. The encoded data searching apparatus according to claim 10, the process further comprising:
receiving instruction information that specifies either the synonym or the notation fluctuation word is the searching target,
wherein the acquiring acquires a plurality of codes corresponding to the synonym of the basic form or the notation fluctuation word, on the basis of the instruction information.

12. The encoded data searching apparatus according to claim 9,
wherein the searching compares the code included in the encoding document with the first automaton, the second automaton or the third automaton, and specifies a code and a flag of which is set in the first automaton, the second automaton or the third automaton, indicating the searching target.

* * * * *